INVENTORS
JACK DIAMOND
WAYNE M. GAUNTT
BY William L. Krazer
ATTORNEY

United States Patent Office 3,154,498
Patented Oct. 27, 1964

3,154,498
WATER TREATING COMPOSITION
Jack Diamond, Culver City, and Wayne M. Gaunt, Los Angeles, Calif., assignors to Calgon Corporation, a corporation of Pennsylvania
Filed Dec. 6, 1960, Ser. No. 74,178
2 Claims. (Cl. 252—180)

This invention relates particularly to the treatment of rinse water used in dishwashing machines and the like. It may be utilized in general wherever it is desired to lower the surface tension of water.

This is a continuation-in-part of our copending patent application Serial No. 854,341, filed November 20, 1959, abandoned after the filing date hereof, the entire specification and claims of which are adopted herein as part of this disclosure and the benefit of the filing date for which is claimed.

Prior to the present invention, it had been a widespread practice in commercial dishwashing operations to inject into the rinse water of the dishwashing machine a more or less regulated amount of a liquid wetting agent. The purpose of the wetting agent is to lower the surface tension of the rinse water in order to minimize spotting, streaking, and the like on dishes, glassware, tableware, and other utensils as they dry. Having a lowered surface tension, the water tends to roll off the surface of the dishes, glasses, or table utensils, carrying with it any impurities present. Unsightly depositions on the glassware, tableware, and the like which would otherwise occur on drying of the water drops are thus prevented.

Such treatment of the rinse water is quite useful to a restaurant operator for example, because it greatly hastens the drying process. In addition, sanitary laws in most localities prohibit the use of towels or other hand drying methods in public eating places. Rince water treatment is also desirable for domestic dishwashers, but has not been widely accepted largely because of difficulties in dispensing. Rinse water treatment is desirable in washers used for cleaning any hard surface material such as cans, bottles, metal parts, plastics, etc.

Other uses for wetting agents in general may be mentioned. Among these are improving the usefulness of irrigation water by insuring its penetration into the soil, improving the wettability of fire-fighting water, and so on.

There are several notable disadvantages to liquid rinse treating compositions. Perhaps foremost among them is the difficulty of controlling the rate of addition of the composition according to varying needs. Relatively complicated dispensers are needed to insure that the entire dose will not be consumed and drained out of the washer in the first few seconds of rinsing. In domestic dishwashers where the rinsing operation takes place in the washing chamber, the dispensers required are much too elaborate and hence too expensive and may still be subject to breakdown. Consequently, domestic dishwashers are usually not equipped with liquid rinse-aid dispensers.

A further disadvantage to liquid rinse-treating compositions in general is that the so-called "low sudsing" wetting agents should comprise at least part of the composition. They should be used because of the otherwise uncontrolled formation of efficiency-reducing foam due to immediate dispersion and high solution rates. The "low sudsers" used in the liquid rinse treating compositions are not particularly good cleaners due to their hydrophobic-hydrophilic balance.

We have invented a new product and process which provides excellent rinse water without the necessity of complicated metering or injection devices and which requires a minimum of attention even for replenishment.

We have discovered that a composition of solid wetting agents may be formed into a block, pellet or bar and positioned in the stream of rinse water to provide a gradual and controlled rate of dissolution, thus adding to the rinse water (or water to be used for other purposes) the desired amount of wetting agent, all the while maintaining better surface activity than is possible with a liquid rinse-aid agent. We may also employ a rinse-aid block of our composition which may be situated loose anywhere in the chamber of a washing machine and which will perform its function without the use of a dispenser of any kind.

In the accompanying drawings.

Figure 1:
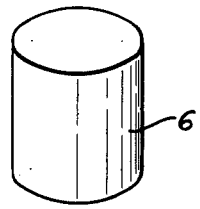
FIGURE 1 shows a block of our invention of a shape appropriate for a feeder of a particular type.

Referring to FIG. 1, the block is of cylindrical shape. The block consists essentially of one or more solid "wetting" or "surface-active" agents and whatever other ingredients may appear desirable, although none need be used. The preferred chemical compositions and methods of manufacture will be discussed infra. Of course, the block may be in other forms such as cubical or conical. Where paper cups are used as molds, the blocks will be in the form of tapered cylinders.

Figure 2:
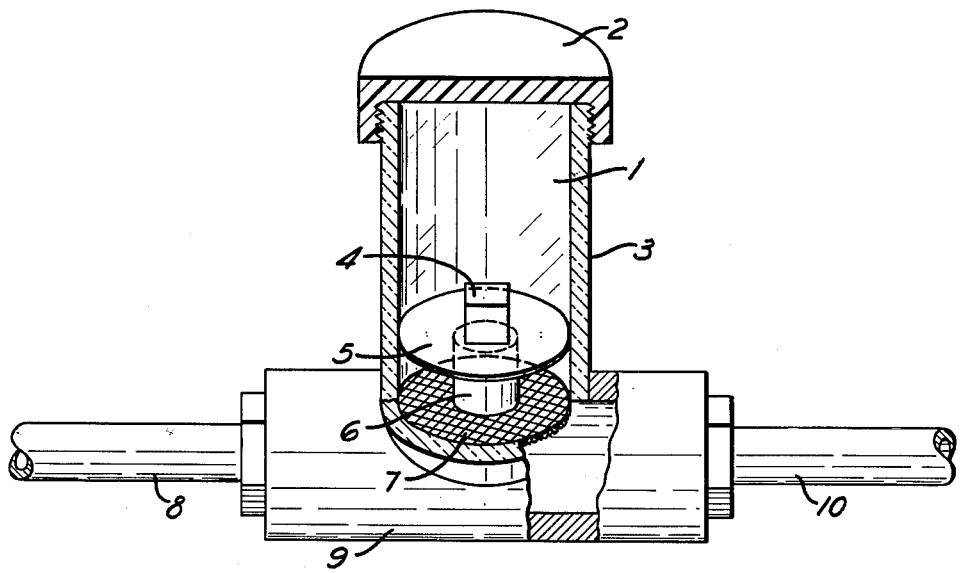
FIG. 2 shows the block of FIG. 1 positioned in the feeding chamber of a feeder adapted for insertion into the rinse water line of a commercial dishwasher.

In FIG. 2 a purely illustrative rinse-aid feeder is shown loaded with a block of our invention. Chamber 1 defined by housing 3 is sealed at the top by cap 2. Within the chamber 1 are a weight 4, weight carrier 5, and a block of our rinse additive 6. The block of rinse additive rests on a wire screen 7 or other suitable screen of medium mesh. Water passing through pipe 8 enters chamber 9 and contacts the block of rinse additive through screen 7. In so contacting the block, the water dissolves a small portion of the block and passes out through pipe 10 to be used. A feeder capable of exposing a controlled area to the water may be used where a higher degree of control over the rate of consumption is desired; however, such a feeder need not be used in our invention. An example of such a feeder, designed to expose only an end surface of a cylindrical block, would be a feeder similar to that of FIG. 2 in which the diameter of chamber 1 is equal to the diameter of the cylindrical rinse-aid block. The illustrated feeder may be used without the weight or weight carrier and without regard to the diameter of the block in relation to the diameter of the feeder where a controlled exposed surface area is not critical.

Figure 3:
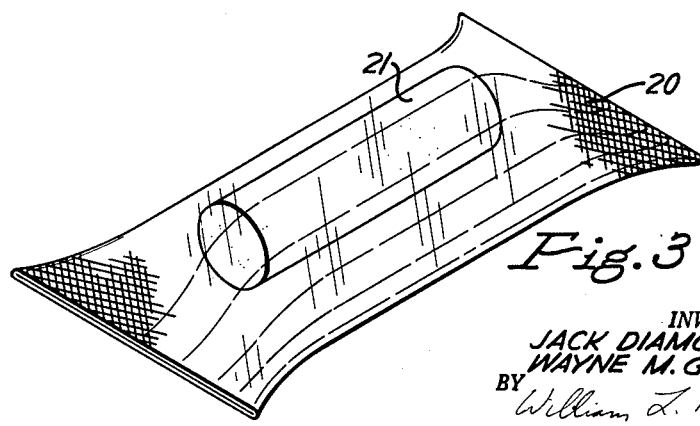
FIG. 3 illustrates a presently preferred form of a packet designed especially for use in domestic dishwashers.

In FIG. 3 a packet of rinse-aid material of our invention is depicted. It is designed particularly for use in domestic dishwashers. It comprises an envelope 20 of mesh material or having perforations, enclosing a block or pellet 21 of our rinse-aid material. Envelope 20 may be made of a soluble material such as a polyvinyl alcohol or an insoluble one. Our preferred domestic product is enclosed in an envelope of insoluble mesh material. If a soluble material is used for the envelope, it may be designed to dissolve during the wash cycle of the dishwater so that the rinse-aid material is not exposed to the water until the rinse cycle begins. Where this result is desired, the envelope, of course, need not be in the mesh form, but may be solid. Moreover, it may be in the form of a simple coating on the block or pellet. The block or pellet 21 may be of any shape. It should be noted that a relatively thin disc combines the characteristics of constant rate of solution (relatively constant surface area throughout life) with ease of manufacture.

Several factors must be considered in the proper use of our invention. In addition to the methods discussed above of exposing the block to the water, a very effective method of exposing the block to water is merely to insert it directly in the pipe or stream of water feeding the rinse water. In domestic dishwashers and so-called under-the-counter dishwashers, the block may be deposited anywhere in the washing chamber. Or, depending on the rate of solution desired, more or less surface area may be exposed in one way or another to the water. In addition to the factors mentioned above on the subject of exposure to water, it should be said that too great a downward force (provided by weight 4) on the block resting on a screen as in FIG. 2 may extrude the rinse-aid and cause undesirable deposits of solid material. The water pressure is also significant. Temperature of the water also affects, the solubility under the circumstances. We have found that the solid wetting agents are not as soluble in cold water as in hot water. Thus, a relatively soluble agent should be used for fire-fighting applications, for example.

Another factor affecting our invention is the composition of the rinse-aid block. Generally, any wetting agent in pellet, block, or bar form is within the contemplated area of our invention. However, we have found that some wetting agents perform better in our invention when they are in the presence of other materials to be described infra.

Another factor which significantly affects the performance of our invention is the method of manufacture of the block or pellet in its final form. This, too, will be taken up infra.

COMPOSITION

Although any solid wetting agent is contemplated in our invention, we have found that certain solid compositions are better than others. We have also found that the inclusion of a small amount of a long chain substituted amide will assure proper control over the solution rate of the composition in the range of temperatures normally used in hot water mechanical washers. Specifically, we may include in our rinse-aid block solid nonionic wetting agents of the type known as "Pluronic F-68," "Tetronic 707 or 908," "Triton X-67," any of the "Carbowax" series, and "Igepal DJ-970." The chemical compositions presently sold under these trademarks are as follows:

(1) "Pluronic F-68"—A solid ethylene oxide-propylene oxide block polymer:

$$HO(CH_2CH_2O)_a(CH_2\overset{CH_3}{\underset{|}{C}}HO)_b(CH_2CH_2O)_cH$$

in which "a" and "c" are about 82 and "b" is about 31.

(2) "Tetronic 908"—A solid ethylene diamine ethoxypropoxy block polymer having about 68 propoxy groups and about 500 ethylene oxide groups:

$$\begin{matrix} H(C_2H_4O)_y(C_3H_6O)_x & & (C_3H_6O)_x(C_2H_4O)_yH \\ & \diagdown N-CH_2-CH_2-N \diagup & \\ H(C_2H_4O)_y(C_3H_6O)_x & & (C_3H_6O)_x(C_2H_4O)_yH \end{matrix}$$

in which "x" is about 17 and "y" is about 125.

(3) "Tetronic 707"—A solid ethylene diamine ethoxypropoxy block polymer having about 52 propoxy groups and about 204 ethoxy groups:

$$\begin{matrix} H(C_2H_4O)_y(C_3H_6O)_x & & (C_3H_6O)_x(C_2H_4O)_xH \\ & \diagdown N-CH_2CH_2N \diagup & \\ H(C_2H_4O)_y(C_3H_6O)_x & & (C_3H_6O)_x(C_2H_4O)_yH \end{matrix}$$

in which "x" is about 13 and "y" is about 51.

(4) "Triton X-67"—A solid mixture of ethoxylated cetyl and stearyl alcohols having 30 ethoxy groups:

$$C_{16}H_{33}O(CH_2CH_2O)_{30}H$$

and $$C_{18}H_{37}O(CH_2CH_2O)_{30}H$$

(5) "Carbowax 6000"—A solid polyethylene glycol having a molecular weight of about 6000.

(6) "Igepal CO-887"—A solid ethoxylated nonyl phenol having 30 ethylene oxide groups:

$$C_9H_{19}-\underset{}{\underset{}{\bigcirc}}-(CH_2CH_2O)_{30}H$$

(7) "Igepal DJ-970"—A solid alkyl phenoxy poly(ethyleneoxy) ethanol.

Among the alkyl substituted amides which we may use are "Acrawax" (Glyco Products Company), "Armowax" (Armour), and "Armid HT" (Armour). "Armowax," our preferred composition, is a commercial form of methyldistearyldiamide:

$$\begin{matrix} & O & H \\ & \| & \diagup \\ H_{35}C_{17}C-N & \\ & & \diagdown CH_2 \\ & O & \diagup \\ & \| & \\ H_{35}H_{17}C-N & \\ & & \diagdown H \end{matrix}$$

"Armid HT" is a commercial form of stearamide:

$$\overset{O}{\underset{\|}{H_{35}C_{17}C}}-NH_2$$

We may use any normally solid waxy amide having the general formula:

$$R-\overset{O}{\underset{\|}{C}}-\overset{X}{\underset{|}{N}}-Y$$

where "R" is an alkyl group of at least about 6 carbon atoms; "X" is H or an alkyl group; "Y" is H, alkyl group, or a group having the formula $$(CH_2)_n\overset{Q}{\underset{|}{N}}-\overset{O}{\underset{\|}{C}}-Z$$

where "n" is an integer from 1 to about 4, "Z" is an alkyl group having at least about 6 carbon atoms, and "Q" is hydrogen or an alkyl group.

Although a great many variations in combinations of the described ingredients and others may be made according to this invention, we have found a particular range of constituents to be the best performers in mechanical dishwashers. The relative performance of various compositions is in many respects a matter of judgment based on visual observation of the degree of spotting, streaking, fogging, and the like. It should be recognized, however, that the advantages of ease in handling and dispensing are obtained in each case.

One method of measuring the effectiveness of a wetting agent is to observe the change in surface tension of the treated water brought about by the additive. To this end, the following test was run. A group of blocks were made as follows, by weight: 4½% "Armowax," 23½% "Pluronic F-68," 72% "Tetronic 908," melted together at 300° F., poured into cylindrical Plexiglas 1¾" internal diameter molds, and immediately placed in a refrigerator at 30° F. to solidify. The test included preparation of four test solutions of one liter each by dissolving the desired amount of rinse additive composition in water at 195° F. and adding it to the liter container. The water in each solution prior to addition of the rinse additive had a surface tension at room temperature of 73 dynes per square centimeter by the Du Nouy method. Table I compares results in the four solutions at various temperatures:

*Table I*

[Surface tension (dynes/sq. cm.)]

| Temp., °F. | Conc., p.p.m. | | | |
|---|---|---|---|---|
| | 10 | 20 | 40 | 80 |
| 120 | 53 | 49½ | 47 | 46 |
| 130 | 49 | 46½ | 45 | 44 |
| 140 | 47½ | 44 | 42 | 41½ |
| 150 | 45½ | 42 | 40½ | 39½ |
| 160 | 44 | 40½ | 39 | 38 |
| 170 | 42½ | 39 | 37½ | 36½ |
| 180 | 41½ | 38½ | 36½ | 35½ |
| 190 | 40 | 37½ | 35½ | 34 |

Another test was run to demonstrate the solubilities of compositions of varying amide content. To this end, rinse-aid blocks weighing 50 grams each were molded in standard laboratory test tubes. They contained the following ingredients:

(No. 1) 5% Armowax, 20% Pluronic F-68, 75% Tetronic 908
(No. 2) 10% Armowax, 20% Pluronic F-68, 70% Tetronic 908
(No. 3) 15% Armowax, 20% Pluronic F-68, 65% Tetronic 908
(No. 4) 20% Armowax, 20% Pluronic F-68, 60% Tetronic 908

The rinse-aid sticks were used in a complete wash-rinse-dry cycle of a standard domestic dishwasher using tap water at 120° F. The average weight losses in grams ranged progressively from 1.8 g. to 0.80 g. for compositions 1 thru 4. A composition even more soluble than composition No. 1 is that consisting of 3.5% Armowax, 21.5% Pluronic F-68, and 75% Tetronic 908.

In general our rinse-aid block may consist of any solid nonionic wetting agent which may be formed in a block, pellet, or bar. The softening point of the finished mixture should not be significantly lower than water temperatures usually encountered in the normal contemplated use of the block, although any individual ingredient may have a melting point lower than this range.

MANUFACTURE

The method followed in manufacturing the rinse-aid block definitely affects its performance. The procedure will be discussed step by step.

A. The powdered or chunk wetting agents, if more than one are used, are in the preferred procedure first mixed in dry form. Next the wetting agent materials are melted together under gentle agitation and the substituted amide is preferably added after the wetting agents have at least begun to melt. The agitation used should not be of the type which is likely to cause bubbling or air entrapment. In the case of our presently preferred dish rinse composition consisting of 72% "Tetronic 908," 23½% "Pluronic F-68," and 4½% "Armowax," the temperature of the melt need not exceed 150° C. At about 145° C., a homogeneous liquid has been formed.

B. After the material has reached the homogeneous liquid state, one of two preferred procedures may be followed. The choice of procedure will depend primarily on the rate of solution desired and the intended use of the product.

Generally, a product intended for use in a line-type dispenser such as is found in commercial (restaurant) dishwashers should be more soluble than a product intended for use in a domestic or other dishwasher where it will be placed loose in the washing and rinsing chamber and subjected to considerable buffeting, forced spray and the like. This is true even though the water used in the commercial dishwasher is likely to be hotter than that of the domestic dishwasher.

A product of low solubility for use in domestic dish washers may be prepared by pouring the homogeneous melt directly into molds of the desired final form and permitting them to cool slowly. A suitable inexpensive mold is an ordinary paper cup. If a paper cup is used as a mold, an additional advantage is obtained in that the product may be sold already packaged in its own mold. Of course, the mold may be removed and the product packaged in any manner seen fit.

On the other hand, a product containing the same chemical ingredients but nevertheless having a much higher solubility rate may be prepared by pouring the homogeneous liquid melt into flat pans to a depth of about ¼" to ½" and cooling it by subjecting it immediately to a cold environment as low as about 0° F. or as high as room temperature.

Our preferred product for commercial dishwashers having line-type dispensers is made by pouring the homogenous liquid melt into flat pans to a thickness of about ¼" to about ½" and placing the pans on a water-cooled conveyor for about 16 minutes. The water-cooled environment preferably is at a temperature of about 50° F.–70° F. During the water-cooling period, the mass achieves a fairly solid state. After this cooling period, the pans are further air-cooled for about 45 minutes.

C. After solidification and cooling of the substance in the pans, it is preferably chipped or crushed into small pieces and compressed into the desired final shape. About 5000 p.s.i. is quite sufficient to achieve superior compactness. Higher pressures up to about 7000 p.s.i. have been tried and also provided excellent results.

The several factors mentioned above which affect the performance of the product will be discussed again below:

(1) *Time required for melting.*—There appears to be no practical effect on solubility caused by the relatively long melting period required for large batches of composition as opposed to small batches.

(2) *Thickness or depth.*—The depth or thickness of the mass during the cooling period definitely affects the resultant solubility of the product. The low thermal conductivity of the materials greatly delays hardening of the innermost portions of the mass, which permits crystal formations of segregated materials and consequent lower over-all solubility rates. The over-all solubility rate is thus inversely related to the thickness of the mass during cooling.

(3) *Rate of cooling.*—Generally, the more rapidly the melt is cooled, the more rapidly the product will dissolve. The rate of cooling below about 100° F., however, does not appear to be critical. A melt poured at approximately 300° F. will remain substantially unchanged until it cools to about 250° F. In the range between 250° F. and about 100° F., however, hardening takes place in the form of particle formation. Where the mass is cooled through this range slowly (i.e. 45 minutes or more), the product will exhibit the characteristic of slow solubility. For example, a 30 gram product poured into a paper cup mold and cooled at room temperature will require more than 24 hours to dissolve in a water passage. Under the same conditions, a compressed 60 gram briquette made from rapidly cooled material requires only about 1½ hours to completely dissolve.

Rapidly cooled material, such as that placed in a freezer immediately after pouring, develops a characteristic fracturing pattern stretching inwardly from the outer edges of the mass. Conversely, the slowly cooled material exhibits correspondingly fewer fractures. A chilled surface may exhibit, in addition to the cracks, a wrinkling effect accompanied by a raising or expansion of the surface. This is an additional reason why the direct mold product should not be subjected to cold, but rather should be cooled slowly. Cooling at an intermediate rate produces a product of intermediate solubility.

PERFORMANCE

The performance of the product is affected by the factors of composition and manufacturing procedure already discussed. In addition, several other factors should be mentioned.

A. *Temperature of the water.*—Although we have made no recorded studies directed specifically to the effect of temperature of the water on solubility and performance, from visual observation and studies on other factors we have determined that the products of our invention dissolve more readily in higher temperature water. However, the difference through the range of normal hot water temperatures (in the home, normally 110° F. to 140° F.; in commercial usage, up to about 190° F.) is not great enough to significantly affect ultimate performance, especially in a domestic dishwasher where the factor of attrition is at least as significant as the temperature of the water.

B. *Particle size of the compressed product.*—Very small particles will physically separate from the block before dissolving.

C. *Nonuniformity of solubility.*—A coral-like effect appears on the surface of the compressed block during dissolution. This is primarily due to the relatively high solubility of the portions which cooled and solidified first.

Although we speak of "solubility" and use the word "dissolve" in the popular sense throughout the specification, it will be understood by those familiar with the art that the large molecules of the materials used in our invention do not "dissolve" as does salt or sugar. In using the words "dissolve," "solubility," and the like, we mean to include the process of dispersion throughout a liquid medium which may or may not be accompanied by molecular dissociation.

D. *Position of the block.*—The method of exposing the block to water affects the solubility rate also. A dispenser of the type shown in FIG. 2 provides a relatively low consumption rate. Even lower consumption may be achieved by exposing only one surface of the block to the water, as by employing a cylindrical dispenser of the same diameter of the block. Positioning the block directly in the stream of water, as in an enlarged chamber located directly in the pipe line, provides slightly higher consumption rates.

In an open chamber such as that of a domestic dishwasher, the attrition caused by buffeting and high pressure sprays results in higher consumption rates. If the block is partially protected by a small wire basket or the like, a lower rate of consumption will result. The insoluble plastic mesh envelope shown in FIG. 3 prevents excessive rates of consumption due to attrition and breakage not only by absorbing the force of the spray but also by holding separated particles within it.

Having thus described and illustrated several presently preferred forms and variations of our invention, it should be distinctly understood that it may be otherwise variously embodied and practiced within the scope of the following claims.

We claim:

1. A composition for treating water consisting essentially of (*a*) about 3% by weight to about 20% by weight methyl distearyldiamine, (*b*) about 20% to about 27% by weight solid ethylene oxide-propylene oxide block polymer of the formula

in which $x$ and $z$ are about 82 and $y$ is about 31, and (*c*) the balance a solid ethylene diamine ethyoxypropoxy block polymer having about 68 propoxy groups and about 500 ethylene oxide groups.

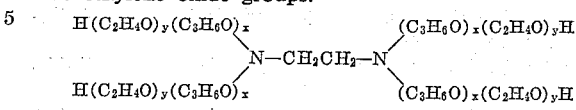

in which $x$ is about 17 and $y$ is about 125.

2. A composition for treating water consisting essentially of (*a*) about 3% by weight to about 20% by weight methyl distearyldiamide, (*b*) about 20% to about 27% by weight of a solid ethylene oxide-propylene oxide block polymer of the formula

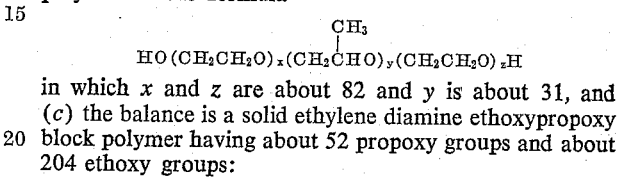

in which $x$ and $z$ are about 82 and $y$ is about 31, and (*c*) the balance is a solid ethylene diamine ethoxypropoxy block polymer having about 52 propoxy groups and about 204 ethoxy groups:

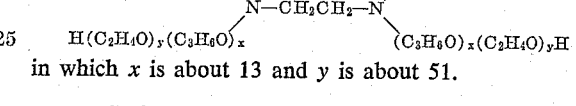

in which $x$ is about 13 and $y$ is about 51.

References Cited in the file of this patent

UNITED STATES PATENTS

| | | |
|---|---|---|
| 1,592,126 | Paige | July 13, 1926 |
| 1,970,578 | Schoeller et al. | Aug. 21, 1934 |
| 2,498,325 | Zamanek | Feb. 21, 1950 |
| 2,649,203 | Hannibal | Aug. 18, 1953 |
| 2,674,619 | Lundsted | Apr. 6, 1954 |
| 2,677,151 | Jennings | May 4, 1954 |
| 2,927,900 | Shiraeff | Mar. 8, 1960 |
| 2,982,737 | Boettner | May 2, 1961 |

OTHER REFERENCES

Zimmerman et al.: "Handbook of Material Trade Names," Industrial Research Service, 1953, pp. 63 and 64.

"Pluronics in Metal Cleaning Formulations," Wyandotte Chemicals Corp., Jan. 7, 1957, page 9.

"Pluronics for Home and Commercial Laundry Formulations," Wyandotte Chemicals Corp., Oct. 23, 1958, page 3.